US007436854B2

(12) United States Patent
Miyake et al.

(10) Patent No.: US 7,436,854 B2
(45) Date of Patent: Oct. 14, 2008

(54) TRANSMITTER DEVICE FOR CONTROLLING DATA TRANSMISSION

(75) Inventors: Motoharu Miyake, Yokosuka (JP);
Hiroshi Inamura, Yokohama (JP);
Kazunori Yamamoto, Yokohama (JP);
Hideharu Suzuki, Yokohama (JP);
Osamu Takahashi, Kunitachi (JP)

(73) Assignee: NTT Docomo, Inc., Tokyo (JP)

( * ) Notice: Subject to any disclaimer, the term of this patent is extended or adjusted under 35 U.S.C. 154(b) by 544 days.

(21) Appl. No.: 11/040,885

(22) Filed: Jan. 21, 2005

(65) Prior Publication Data
US 2005/0190720 A1  Sep. 1, 2005

(30) Foreign Application Priority Data
Jan. 23, 2004 (JP) ............................ 2004-016074
Jan. 13, 2005 (JP) ............................ 2005-006824

(51) Int. Cl.
*G06F 15/16* (2006.01)
(52) U.S. Cl. ...................................... 370/469; 709/230
(58) Field of Classification Search ................ 455/343; 370/274, 279, 293, 315, 492, 469, 231, 235, 370/236, 428, 522, 230, 252, 253, 400, 410; 358/426.01, 1.15; 709/358; 340/7.26, 7.25; 714/10, 748, 749
See application file for complete search history.

(56) References Cited
U.S. PATENT DOCUMENTS
6,018,516 A * 1/2000 Packer ........................ 370/231

| 2002/0054570 | A1* | 5/2002 | Takeda ........................ 370/252 |
| 2002/0150048 | A1 | 10/2002 | Ha et al. |
| 2004/0148396 | A1* | 7/2004 | Meyer et al. ................. 709/227 |
| 2006/0168262 | A1* | 7/2006 | Frazer ........................ 709/230 |

FOREIGN PATENT DOCUMENTS

| JP | 2002-281106 A | 9/2002 |
| JP | 2003-102057 A | 4/2003 |
| JP | 2003-224619 A | 8/2003 |

OTHER PUBLICATIONS

G. Yang et al., "TCPW with Bulk Repeat in New Generation Wireless Networks," IEEE, pp. 674-678, 2003.

(Continued)

*Primary Examiner*—Chirag G Shah
*Assistant Examiner*—Nima Mahmoudzadeh
(74) *Attorney, Agent, or Firm*—Brinks Hofer Gilson & Lione (57) ABSTRACT

A CPU 41 of a server device 40 measures an elapsed time after transmitting a data segment, and suspends measuring time upon receiving an acknowledgement segment for the data segment. CPU 41 transmits a data segment whose elapsed time has reached a retransmission timeout value. CPU 41 sets, as a retransmission timeout value of a data block, a time value determined according to a monotonically increasing function of a number of transmissions of the data block, during a given time period after the second-time transmission of the data block, while CPU 41 sets a time value which is predetermined and is different from the time value determined by the monotonically increasing function during a period between the first-time transmission and immediately before the second-time transmission of the data block.

9 Claims, 8 Drawing Sheets

OTHER PUBLICATIONS

A. DeSimore, "Throughput Performance of Transport-Layer Protocols over Wireless LANs," IEEE, pp. 542-549, 1993.
European Search Report dated Sep. 25, 2006.
European Office Action dated Dec. 5, 2006.
European Search Report issued on May 30, 2006.
Office Action issued Jan. 7, 2008 in European patent application No. 05 001 198.0.

* cited by examiner

| TRANSMISSION TIMES | 1 | 2 | 3 | 4 | 5 | 6 | 7 | 8 | 9 | 10 |
|---|---|---|---|---|---|---|---|---|---|---|
| RETRANSMISSION TIMEOUT VALUE | 4s | 1s | 2s | 4s | 8s | 16s | 32s | 64s | 64s | 64s |

FIG. 6

| TRANSMISSION TIMES | 1 | 2 | 3 | 4 | 5 | 6 | 7 | 8 | 9 | 10 |
|---|---|---|---|---|---|---|---|---|---|---|
| RETRANSMISSION TIMEOUT VALUE | 1s | 2s | 4s | 8s | 16s | 32s | 64s | 64s | 64s | 64s |

| TRANSMISSION TIMES | 1 | 2 | 3 | 4 | 5 | 6 | 7 | 8 | 9 | 10 |
|---|---|---|---|---|---|---|---|---|---|---|
| RETRANSMISSION TIMEOUT VALUE | 4s | 4s | 1s | 2s | 4s | 8s | 16s | 32s | 64s | 64s |

FIG. 13

| TRANSMISSION TIMES | 1 | 2 | 3 | 4 | 5 | 6 | 7 | 8 | 9 | 10 |
|---|---|---|---|---|---|---|---|---|---|---|
| RETRANSMISSION TIMEOUT VALUE | 4s | 4s | 4s | 4s | 8s | 16s | 32s | 64s | 64s | 64s |

FIG. 14

| TRANSMISSION TIMES | 1 | 2 | 3 | 4 | 5 | 6 | 7 | 8 | 9 | 10 |
|---|---|---|---|---|---|---|---|---|---|---|
| RETRANSMISSION TIMEOUT VALUE | 4s | 2s | 1s | 2s | 4s | 8s | 16s | 32s | 64s | 64s |

US 7,436,854 B2

TRANSMITTER DEVICE FOR CONTROLLING DATA TRANSMISSION

This application claims priority under 35 U.S.C. § 119 to Japanese Patent Application Nos. 2004-016074 filed Jan. 23, 2004 and 2005-006824 filed Jan. 13, 2005, the entire contents of which are hereby incorporated herein by reference.

BACKGROUND

1. Technical Field

The present invention relates to a technique for improving transmission efficiency.

2. Background Information

There are now in wide-spread use a transmitter device and a receiver device which perform data communication according to TCP (Transmission Control Protocol), a protocol followed in Transport Layer (Layer 4). When TCP is employed, a transmitter device sequentially detaches a portion of data having a predetermined data size from a data stream to be transmitted to a receiver device, appends to each data portion a header containing a sequence number to generate a data block (hereinafter, data segment), and transmits data segments starting from one having a least recent sequence number. The sequence number is assigned according to a predetermined rule each time a data portion is detached from the data stream, and is used by a transmitter device and a receiver device for identifying each data segment. A receiver device, upon receipt of a data segment, returns an acknowledgement segment notifying a transmitter device of the receipt. There is written in an acknowledgement segment a sequence number of a data segment which a receiver device expects to receive subsequently to the received data segment. Such use of a sequence number enables a transmitter device to confirm that a data segment transmitted has safety been received by a receiver device.

A transmitter device performs retransmission control using a retransmission timer to cope with a case where a data segment is lost and does not reach a receiver device. A transmitter device, upon transmitting a data segment, causes a retransmission timer to start, which timer expires after a time corresponding to a predetermined retransmission timeout value elapses. When no acknowledgement segment is received that acknowledges a transmitted data segment, for which the timer has been activated, before the retransmission timer expires, the data segment is retransmitted. Conversely, a transmitter device stops a retransmission timer which was activated upon transmission of a data segment if an acknowledgement segment for the transmitted data segment is received. Such retransmission control prevents a transmitter device from being caused to unnecessarily await receipt of an acknowledgement segment that should not be returned in the case of segment loss.

A transmitter device increases a retransmission timeout value each time an identical segment is retransmitted due to a timeout, so as to avoid further deterioration of an already congested state of a communication network which would otherwise further deteriorate due to an influx of more data segments into the network. A retransmission timeout value is exponentially incremented from an initial value and remains constant once it reaches a predetermined maximum value; for example, the timeout value increases as follows: 1 s, 2 s, 4 s, 8 s, 16 s, 32 s, 64 s, 64 s, 64 s .... Generally, an initial value of a retransmission timeout used for data segment transmission is a fixed value if the data segment is transmitted immediately after a communication connection is established, or a value based on an actual measurement of an RTT (round trip time) if the data segment is transmitted after an RTT is measured.

RLC (Radio Link Control) protocol is an example of a communication protocol that is used in a wireless link under Datalink Layer (Layer 2). RLC prescribes retransmission of a data frame over a wireless link, where a data frame is a divided portion of a data segment received from an upper layer. Since data transmission in a wireless link is more likely to experience data propagation delay as compared to that in a wired link, such retransmission in a wireless link is likely to cause more propagation delay between a transmitter device and a receiver device which transmit and receive segments over a wireless link which is a part of a communication path. When propagation delay is increased, there is greater probability of an acknowledgement segment being received at a transmitter device after a retransmission timer expires which was activated at the time of data segment transmission. In other words, a transmission device is caused to retransmit a data segment which appears to be lost due to a retransmission timeout occurring but which, in actuality, has not been lost but has been delayed due to the retransmission performed in the wireless link. Such an instance is more likely to happen when a retransmission timeout value used at a transmitter device is set to a value close to its initial value.

To cope with the above stated deficiency, a technique disclosed in Japanese Patent Application Laid Open Publication No. 2003-102057 (hereinafter, JP 2003-102057) provides a mobile station which notifies to a server a fixed retransmission timeout value at a time when a communication connection is established. A server is then able to use a notified retransmission timeout value to perform data segment retransmission control. Japanese Patent Application Laid Open Publication No. 2003-224619 (hereinafter, JP 2003-224619) discloses a technique where a mobile station notifies, during communication, to a server a retransmission timeout value corresponding to a type of a bearer. A server uses a notified retransmission timeout value to perform data segment retransmission control. Japanese Patent Application Laid Open Publication No. 2002-281106 (hereinafter, JP 2002-281106) discloses a technique where a communication terminal device exponentially increases a retransmission timeout value, where an initial value of the retransmission timeout value is set to a relatively large value (e.g. 10 s) compared to a value determined in consideration of a wired network state.

However, since a retransmission timeout value is fixed to a certain value if the techniques described in JP 2003-102057 and JP 2003-224619 are applied, congestion is likely to further deteriorate in a communication network between a transmitter device and a receiver device. In the technique described in JP 2002-281106, it is possible to reduce occurrences of retransmission of a data segment which appears to have been lost but is not lost in actuality. Nevertheless, use of an initial value of a retransmission timeout value which is a relatively large value and an exponential increase of a retransmission timeout value thereafter results in rough-spacing retransmission timeout at the beginning of retransmission control, which in turn degrades transmission efficiency.

BRIEF SUMMARY

The present invention has been envisioned to solve the above-stated problem, and its object is to provide a technique for reducing occurrences of retransmission of a data segment which appears to have been lost but which, in actuality, has not been lost, without causing any further increase in congestion existing in a communication network between a transmitter device and a receiver device, and without causing any degradation in transmission efficiency.

In one aspect, the present invention provides a transmitter device comprising: transmission means for transmitting a data block to a receiver device in Transport Layer; time keeping means for measuring an elapsed time for a data block, the measurement starting when the data block is transmitted by the transmission means; receiving means for receiving data from the receiver device in Transport Layer; retransmission control means for causing the transmission means to transmit a data block when an elapsed time measured by the time keeping means reaches a retransmission timeout value for the data block; and special setting means for setting, as a retransmission timeout value of a data block, a time value determined according to a monotonically increasing function of a number of transmissions of the data block, during a given time period after second-time transmission of the data block, while setting a time value which is predetermined and is different from the time value determined by the monotonically increasing function during a period between first-time transmission and immediately before the second-time transmission of the data block.

In another aspect, the present invention provides a program product for causing a computer to function as: transmission means for transmitting a data block to a receiver device in Transport Layer; time keeping means for measuring an elapsed time for a data block, the measurement starting when the data block is transmitted by the transmission means; receiving means for receiving data from the receiver device in Transport Layer; retransmission control means for causing the transmission means to transmit a data block when an elapsed time measured by the time keeping means reaches a retransmission timeout value for the data block; and special setting means for setting, as a retransmission timeout value of a data block, a time value determined according to a monotonically increasing function of a number of transmissions of the data block, during a given time period after second-time transmission of the data block, while setting a time value which is predetermined and is different from the time value determined by the monotonically increasing function during a period between first-time transmission and immediately before the second-time transmission of the data block.

In the transmitter device or in a computer by which the program is executed, a retransmission timeout value is set, during a period between first-time transmission and immediately before second-time transmission of a data block, to a predetermined time value that is different from a time value determined according to a monotonically increasing function for determining a retransmission timeout value during a given time period after second-time transmission of the data block.

In still another aspect, the present invention provides a transmitter device comprising: transmission means for transmitting a data block in Transport Layer; time keeping means for measuring an elapsed time for a data block, the measurement starting when the data block is transmitted by the transmission means; receiving means for receiving data from the receiver device in Transport Layer; retransmission control means for causing the transmission means to transmit a data block when an elapsed time measured by the time keeping means reaches a retransmission timeout value for the data block; detection means for detecting an upper limit for at least one of transfer time of data and a number of retransmissions for the same data in a communication link forming a part of a communication path between the transmitter device and the receiver device, the communication link having an upper limit determined for the at least one transfer time of data and number of retransmissions; and special setting means for setting, as a retransmission timeout value of a data block, a time value determined according to a monotonically increasing function of a number of transmissions of the data block, during a given time period after second-time transmission of the data block, while setting a time value corresponding to the upper limit detected by the detection means during a period between first-time transmission and immediately before the second-time transmission of the data block.

In yet another aspect, the present invention provides a transmitter device comprising: transmission means for transmitting a data block in Transport Layer; time keeping means for measuring an elapsed time for a data block, the measurement starting when the data block is transmitted by the transmission means; receiving means for receiving data from a receiver device in Transport Layer; retransmission control means for causing the transmission means to transmit a data block when an elapsed time measured by the time keeping means reaches a retransmission timeout value for the data block; retransmission means for, when transmitted data is lost in a communication link forming a part of a communication path between the transmitter device and the receiver device, the communication link having an upper limit determined for at least one of transfer time of data and a number of retransmissions of the same data, transmitting the data using the communication link if the at least one of transfer time of data and number of retransmissions is under the upper limit; and special setting means for setting, as a retransmission timeout value of a data block, a time value corresponding to the upper limit during a period between first-time transmission and immediately before second-time transmission of the data block, while setting a time value determined according to a monotonically increasing function of a number of transmissions of the data block during a given time period after the second-time transmission of the data block.

According to the present invention, a time value corresponding to propagation delay in a communication link is determined in advance to be set as a retransmission timeout value during a time period existing between first-time transmission of a data block and immediately before second-time transmission of the data block, to thereby reduce occurrences of retransmission initiated when a data segment that is regarded as lost, in actuality, is not lost. Further, according to the present invention, in a transmitter device or in a computer by which the program is executed, a retransmission timeout value is set to a value corresponding to at least one of an upper limit for a transfer time of data and that for a number of times of transmission of the same data, to thereby reduce instances of retransmission resulting from a data segment that has not been lost being regarded as lost.

Further, according to the present invention, in a transmitter device or in a computer by which the program is executed, a retransmission timeout value for a data block increases every time the data block is transmitted during a given time period after a second-time transmission of the data block, it is possible to avoid excessive transmission of data blocks into an already congested communication network, to thereby avoid any further increase in congestion in a communication network and to increase transmission efficiency.

DETAILED DESCRIPTION OF THE PREFERRED EMBODIMENTS

Description will be given of an embodiment of the present invention with reference to the attached drawings.

Configuration

Figure 1:
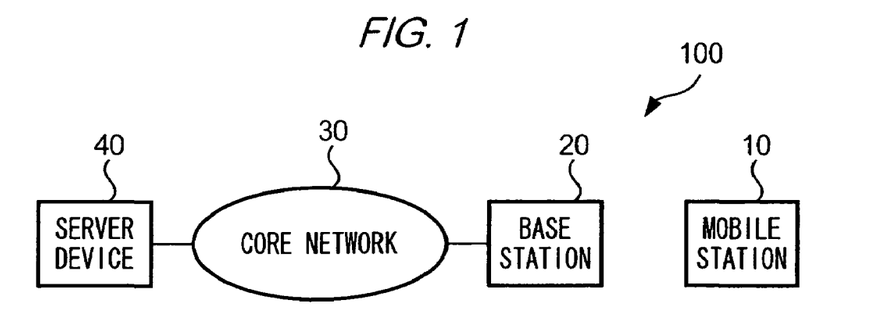
FIG. 1 is a diagram showing an example of a configuration of a communication system 100 according to an embodiment of the present invention.

FIG. 1 is a diagram showing an example of a configuration of a communication system 100 according to an embodiment of the present invention.

As shown in the figure, a communication system 100 comprises a mobile station 10 carried by a user, a base station 20 capable of wirelessly communicating with mobile stations 10 located in a wireless area covered by base station 20, and a server device 40 connected to a core network 30 to which base station 20 is connected. Mobile station 10 is capable of communicating with server device 40 via base station 20 and core network 30. Server device 40 is a gateway server which is also connected to an external network (not shown) such as the Internet. Communication system 100 conforms to IMT-2000 (International Mobile Telecommunications-2000), and, within communication system 100, there can be one or more of each of mobile station 10 and base station 20. Mobile station 10 and server device 40 perform communication process in Transport layer according to TCP.

Figure 2:
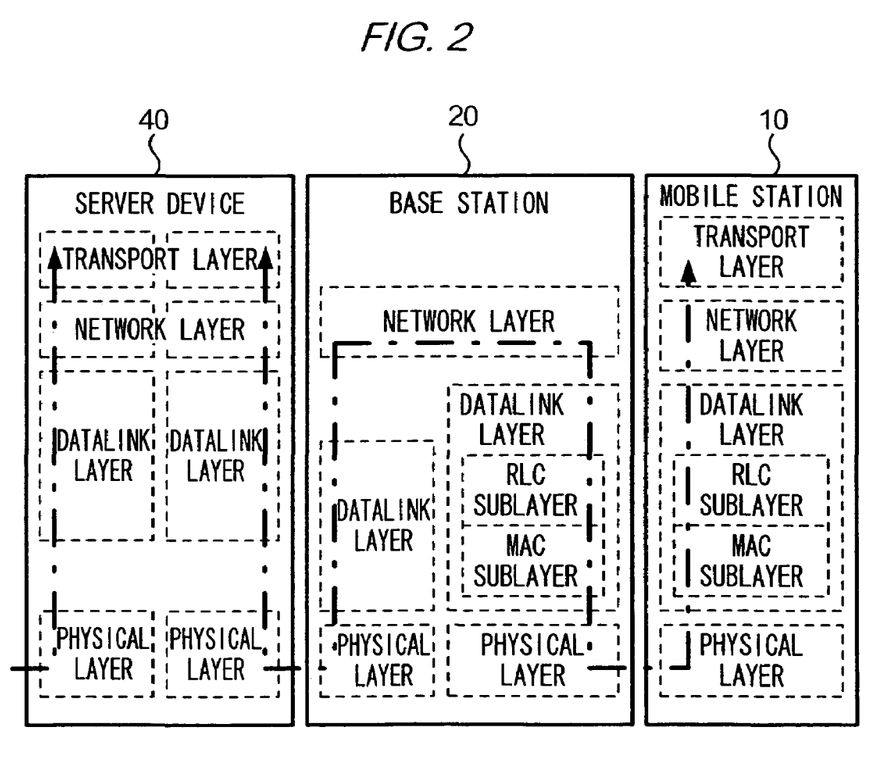
FIG. 2 is a diagram showing an example of a communication protocol stack in communication system 100.

FIG. 2 is a diagram showing a communication protocol stack of communication system 100.

As shown in the figure, communication in Transport Layer is terminated only at mobile station 10 or server device 40, whereas communication in Datalink Layer is terminated at mobile station 10, base station 20, server device 40, or a communication device belonging to core network 30. Datalink Layer between mobile station 10 and base station 20 has an RLC sub layer in an AM mode (Acknowledgement Mode). RLC sub layer is used by mobile station 10 and base station 20 to transfer data frames via a wireless link. In the AM mode, when data frames are transferred, a data frame, when it is deemed to be lost in a wireless link, is retransmitted according to an ARQ (Automatic Repeat Request) system. In the present embodiment, a maximum number of retransmission operations allowed (i.e., the upper limit) is 10 times. In a case where receipt of a data frame at a receiver node (i.e., mobile station 10) is not acknowledged even after retransmission is performed a number of times defined by the upper limit, or where data transfer time (time required for transferring a data frame) exceeds a predetermined time of the upper limit, a transmission node (i.e., base station 20) discards data frames for transmission. In other words, a transmission node discards a data frame for which data transmission delay exceeds the upper limit.

Figure 3:
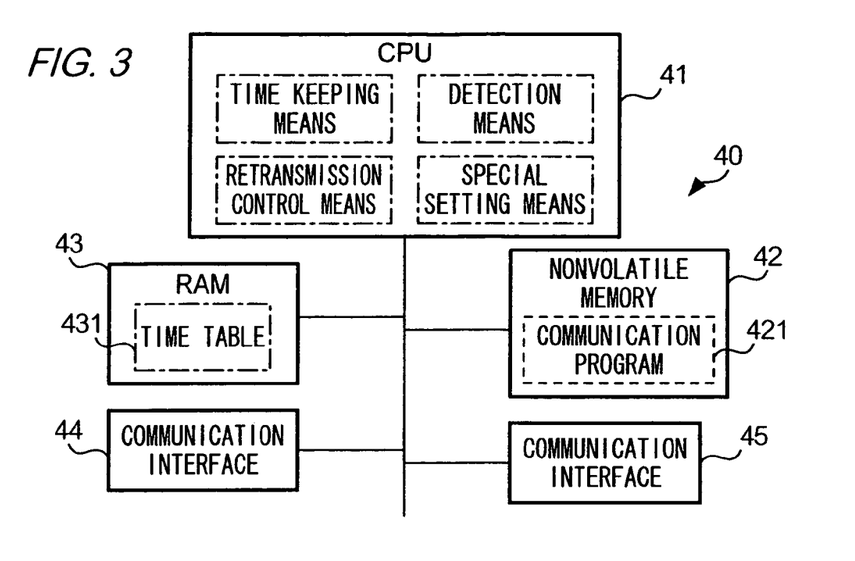
FIG. 3 is a block diagram showing an example of a configuration of a server device 40.
Figure 5:
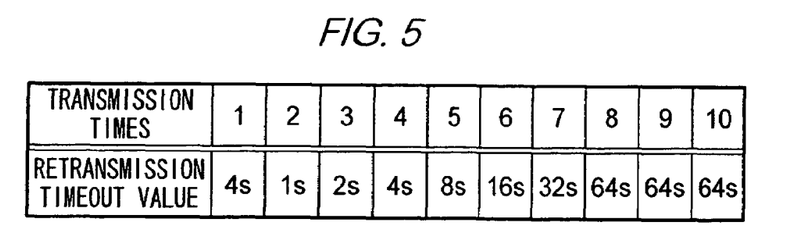
FIG. 5 is a schematic diagram showing details of a time table for a wireless network used by server device 40.

FIG. 3 is a block diagram showing a configuration of a server device 40. As is apparent from the figure, a CPU (Central Processing Device) 41 of server device 40 executes programs stored in nonvolatile memory 42 while using a RAM (Random Access Memory) 43 as a work area, as a general computer device does, to thereby perform various types of processes. There are stored in nonvolatile memory 42 a control program for causing CPU 41 to control execution of programs, and a communication program 421 for causing CPU 41 to perform communication process in Transport Layer according to TCP. As shown in FIG. 3, CPU 41 includes timekeeping means, retransmission control means, and special setting means and/or detection means that are realized when CPU 41 executes and runs the communication program 421. The special setting means sets, as a retransmission timeout value for a first-time transmission of a data segment, a time value determined according to a predetermined time table or a value corresponding to a detected upper limit of a propagation delay in a wireless link, the detection of the upper limit being performed by the detection means. The detection means detects an upper limit of the propagation delay based on the maximum number of times of retransmission allowed for a data frame and the upper limit of the data transfer time in a wireless link. In the embodiment, description will be given of a case where the special setting means sets a retransmission timeout value according to a time table predetermined for a wireless network as shown in FIG. 5, as will be discussed in more detail later.

A communication interface 44 transmits and receives signals between itself and core network 30. When data for transmission is supplied from CPU 41 to communication interface 44, the interface 44 transmits to core network 30 signals modulated according to the transmission data. Conversely, the interface 44 demodulates signals supplied from core network 30 to obtain data, and supplies the received data to CPU 41. Thus, data is exchanged between mobile station 10 via core network 30 by means of communication interface 44 and CPU 41. A communication interface 45 transmits and receives data between itself and an external network. When data for transmission is supplied from CPU 41, the interface 45 transmits signals modulated according to the transmission data to an external network. Signals supplied from an external network are demodulated into data, so that the received data can be supplied to CPU 41. Thus, data is exchanged between a device connected to an external network by means of communication interface 45 and CPU 41.

CPU 41, when power is turned on, executes and runs the control program from nonvolatile memory 42. CPU 41 running the control program runs and executes communication program 421 from nonvolatile memory 42 in response to a request from mobile station 10. From then on, CPU 41 performs a communication process in Transport Layer according to TCP. The communication process includes a selection process performed when a communication connection is established, and a retransmission timer process performed when a data segment is transmitted, immediately after a communication connection is established.

Figure 4:
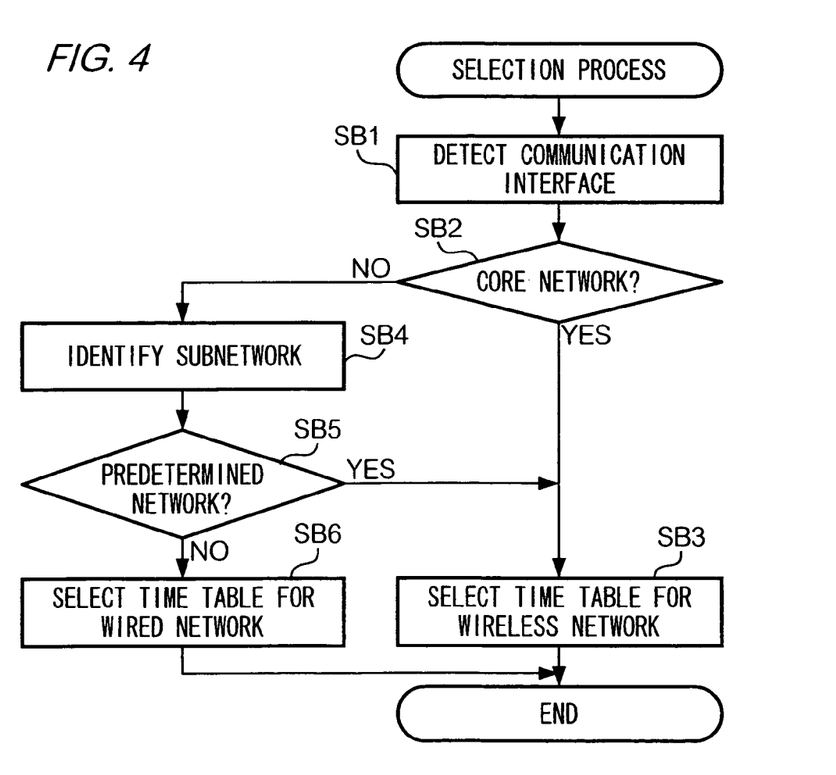
FIG. 4 is a flowchart showing a flow of a selection process performed in server device 40.

FIG. 4 is a flowchart showing a flow of the selection process. As shown in the figure, CPU 41 first detects a communication interface used for establishing a communication connection. When the detected communication interface is communication interface 44 for core network 30, a time table for a wireless network is selected. Conversely, when the detected communication interface is communication interface 45 for an external network, CPU 41 identifies, based on an IP (Internet Protocol) address of a correspondent device, a subnetwork to which the correspondence device belongs. CPU 41 then determines whether the subnetwork is one of predetermined subnetworks, where a predetermined subnetwork is a subnetwork which employs routing via a wireless network during communication. When it is determined that the identified subnetwork is one of the predetermined subnetworks, a time table for a wireless network is selected. When it is determined otherwise, CPU 41 selects a time table for a wired network. The selected time table is used in the retransmission timer process.

A time table is a table defining a retransmission timeout value for a data segment transmitted for a first time, a retransmission timeout value for second-time transmission of the same data segment, then for a third-time segment transmission, and up to a tenth-time transmission of the same data segment. FIG. 5 is a diagram showing an example of a time table for a wireless network. In the table, 4 s (i.e., 4 seconds) is stored for a retransmission timeout value to be set after first-time segment transmission; 1 s is stored as an initial value for a second-time and subsequent segment transmissions, where a retransmission timeout value exponentially increases, the initial value being 1 s, as the number of times of transmission increases. The retransmission timeout value of 4 s for the first-time segment transmission corresponds to an upper limit of propagation delay in a wireless link; that is, the first retransmission timeout value is set to a value of time within which an acknowledgement segment is likely to be received at server device 40 for a data segment transmitted by CPU 41 if propagation delay for data frames constituting the segment is less than the upper limit. There is stored, in a time table for a wired network shown in FIG. 6, a retransmission timeout value of 1s as an initial value, which exponentially increases as a number of transmissions of a segment increases. The minimum value of retransmission timeout values stored in either time table is limited to 1 s and the maximum value is limited to 64 s.

Figure 7:
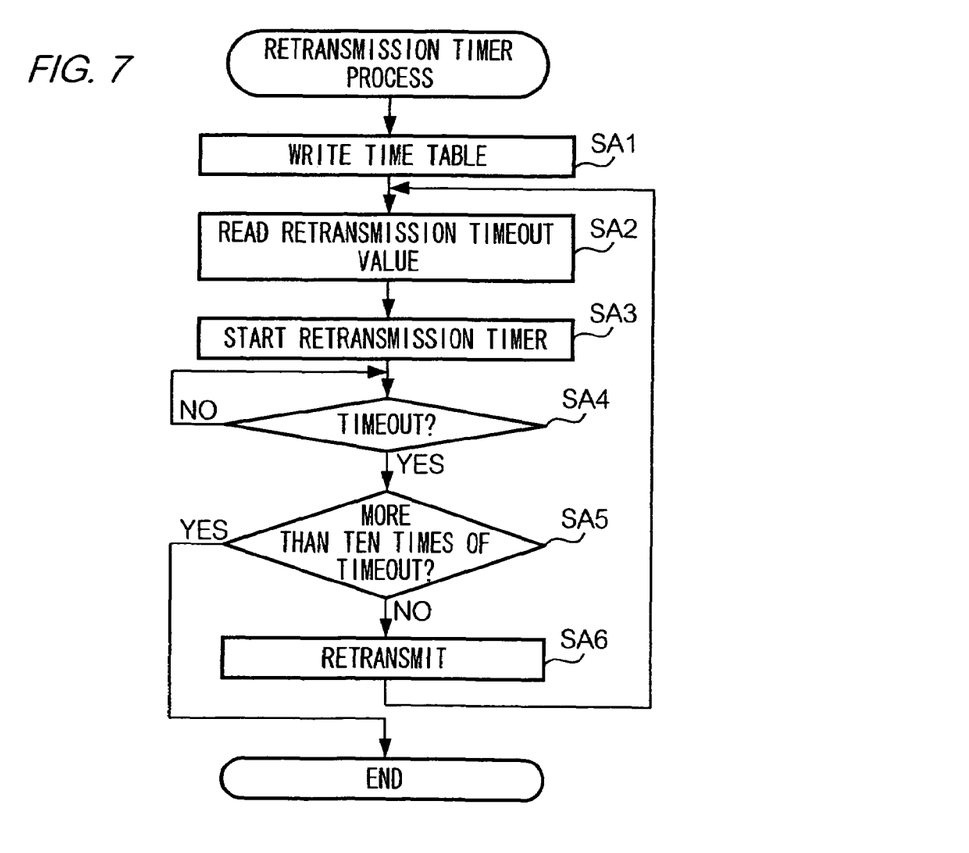
FIG. 7 is a flowchart showing a flow of a retransmission timer process performed in server device 40.

FIG. 7 is a flowchart for showing a flow of a retransmission timer process. In the retransmission timer process, CPU 41 first writes a time table selected in the selection process into RAM 43. The time table thus written in RAM 43 will be hereinafter referred to as a time table 431. CPU 41 then reads from time table 431 a retransmission timeout value corresponding to a number of times of a data segment transmission, to set the read value to a retransmission timer for the transmitted segment. The retransmission timer is then started. The retransmission timer expires when time corresponding to the set value elapses. CPU 41, upon expiration of the retransmission timer, determines whether a number of timeouts for the particular data segment has reached 10 times. In a case where a number of timeouts has reached 10 times, CPU 41 ends the retransmission timer process. Conversely, in a case where a number of timeouts has not reached 10 times, CPU 41 retransmits the data segment, and starts over again from the process of reading a retransmission timeout value. CPU 41, upon receipt of an acknowledgement segment for a transmitted data segment, stops a retransmission timer for the data segment, and ends the retransmission timer process for the data segment.

Operation

Description will now be given of an operation of a communication having the above-described configuration.

When a communication connection is established between mobile station 10, CPU 41 of server device 40 detects a communication interface used for establishing the communication connection (FIG. 4; Step SB 1). CPU 41 selects the time table shown in FIG. 5 when the detected communication interface is communication interface 44 for core network 30 (Step SB2: YES and Step SB3). Conversely, when the detected communication interface is communication interface 45 for an external network, CPU 41 identifies a subnetwork to which a correspondent device belongs based on an IP address of the device, determines whether the subnetwork is one of predetermined subnetworks, and selects the time table shown in FIG. 5 in a case where the identified subnetwork is the predetermined subnetwork (Step SB2: NO, Step SB4, Step SB5: YES, and Step SB3). In a case where the communication interface is not communication interface 44 for core network 30, and a subnetwork to which correspondent device belongs is not one of the predetermined subnetworks, CPU 41 selects the time table shown in FIG. 6 (Step SB2: NO, Step SB4, Step SB5: NO, and Step SB6).

Figure 6:
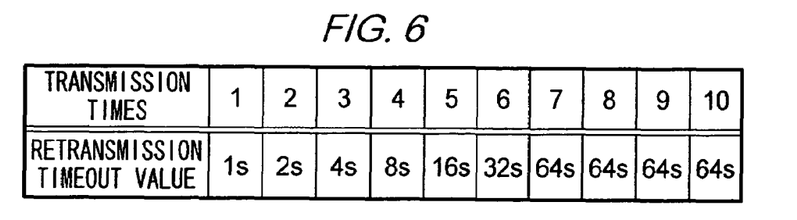
FIG. 6 is a schematic diagram showing details of a time table for a wired network used by server device 40.

An operation performed by server device 40 when the time table of FIG. 6 is selected, is the same as that which is performed by a general server device. Description will be given, hereinafter, of an operation in which it is assumed that server device 40 has selected the time table of FIG. 5. Also, description will be given only of a case of a correspondent device being mobile station 10 because an operation performed by server device 40 is the same regardless of whether a correspondent device is mobile station 10 or a device connected to an external network, except that different communication interfaces are used. It is further assumed that server device 40 transmits a data segment immediately after a communication connection is established. Description will be given with specific reference to a general server device for comparison. Such a general server device is caused to set a retransmission timeout value to 1 s as an initial value, and the value increases exponentially as a number of transmissions increases. In FIGS. 8-11, t0 to t8 each represent times of day; and a time from t0 to t1, a time from t1 to t2, . . . , and a time from t7 to t8 are each 1 s.

Figure 8:
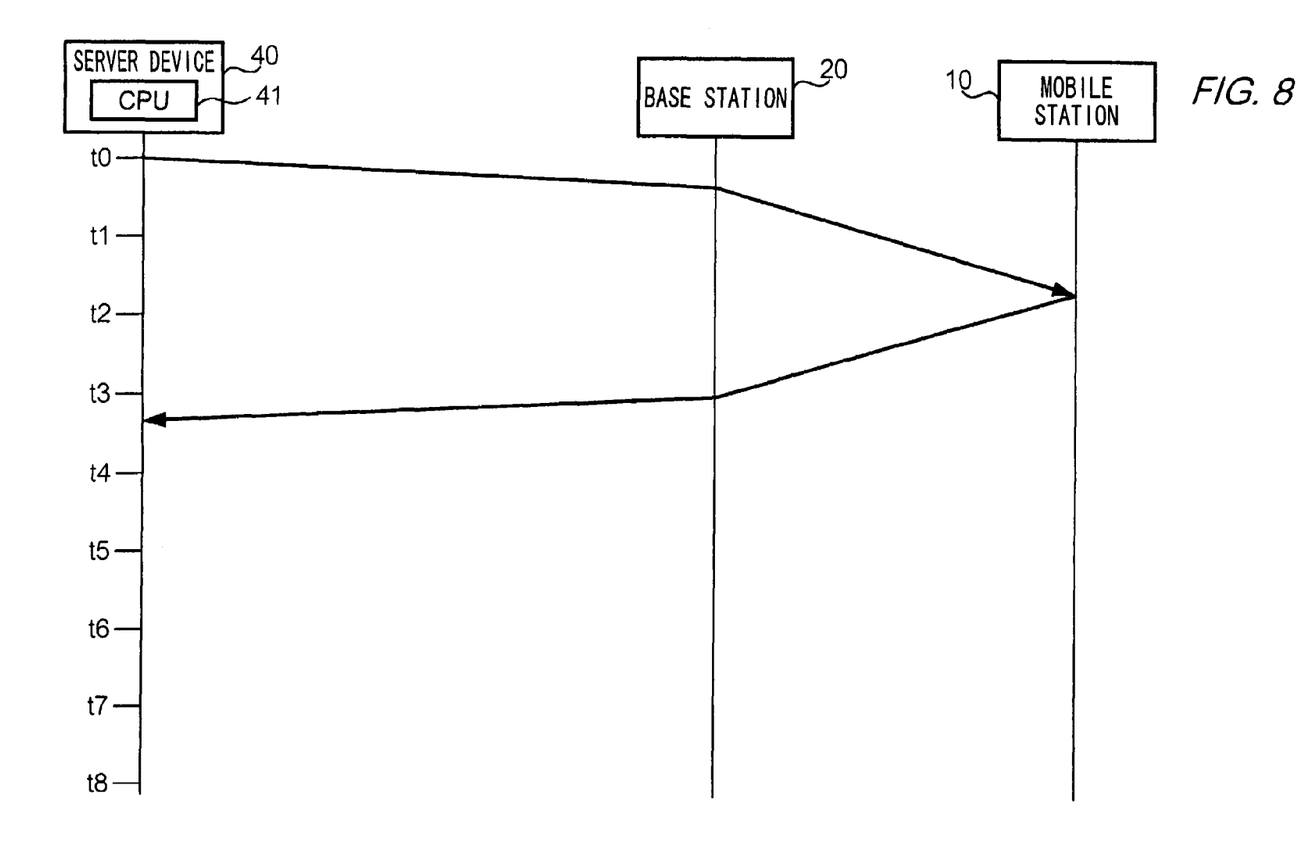
FIG. 8 is a sequence diagram for explaining an operation of communication system 100.
Figure 9:
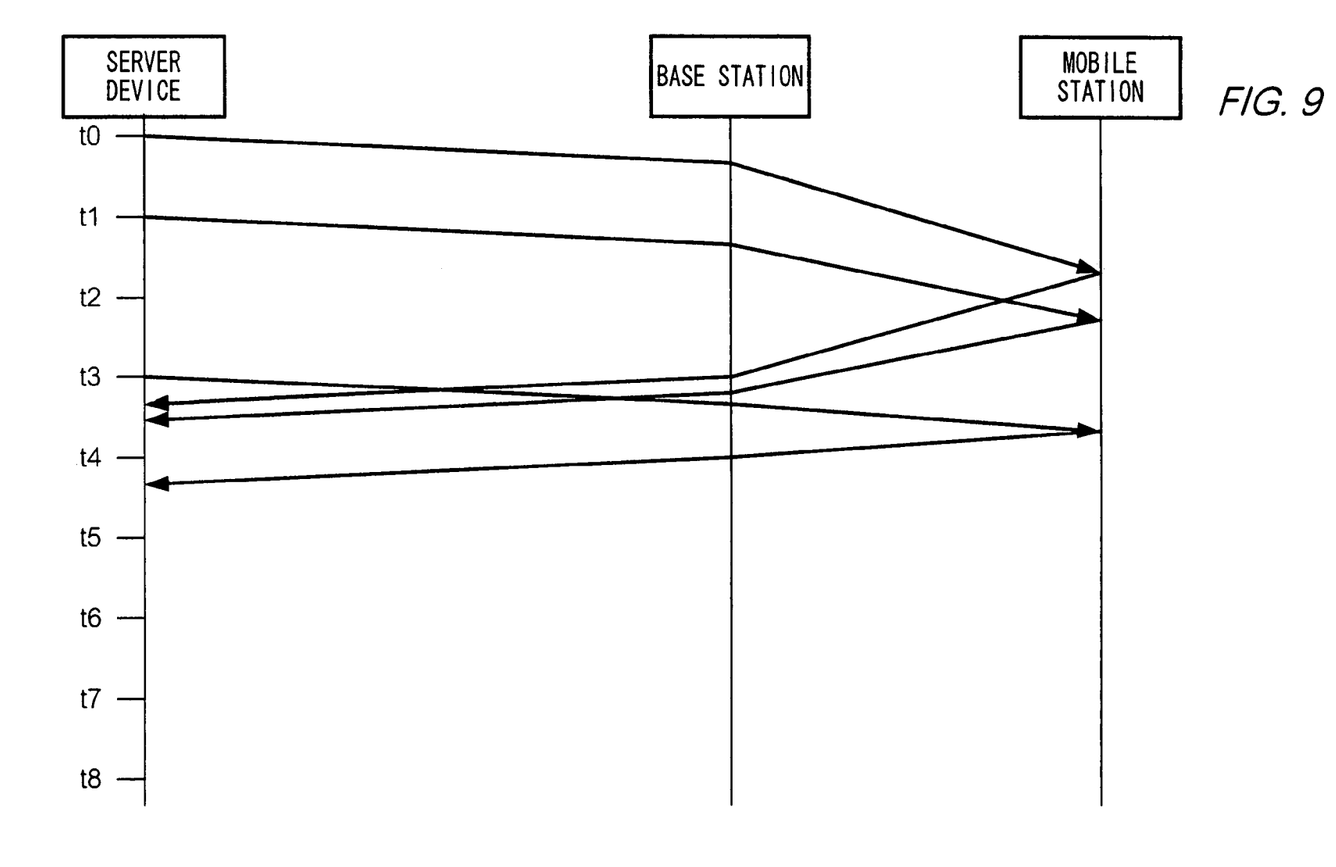
FIG. 9 is a sequence diagram for explaining an operation of a general communication system.

Description will first be given of an operation in a case where a data segment is not lost, with reference to FIGS. 8 and 9. It is assumed in a sequence in each of the figures that the amount of delay in data frame transmission through a wireless link between mobile station 10 and base station 20 is at its maximum at approximately t0, and that it decreases as the time elapses.

First, an operation of communication system 100 is described with reference to FIG. 8. CPU 41 of server device 40 transmits a data segment at t0, at which time the retransmission timer process is started. In the retransmission timer process, CPU 41 writes time table 431 (the time table of FIG. 5) into RAM 43 (Step SA1, FIG. 7). CPU 41 then reads, from time table 431, a retransmission timeout value (i.e., 4 s) corresponding to a number of transmissions (i.e., one time) of a data segment to set the read value to the retransmission timer for the transmitted data segment, and starts the retransmission timer (Steps SA2 and SA3). CPU 41 then waits for the retransmission timer to expire at t4 (Step SA4: NO).

In the meantime, a data segment transmitted by CPU 41 is transferred through base station 20 to mobile station 10. In a wireless link between base station 20 and mobile station 10, data frames constituting the data segment are retransmitted by any number of times not exceeding the upper limit of retransmission (10 times). As a result, the data segment reaches mobile station 10 with significant delay. Mobile station 10 receives the data segment and transmits an acknowledgement segment in response. The acknowledgement segment is transferred through base station 20 to server device 40. The retransmission of data frames is again performed in a wireless link. In this example, the time is between t3 and t4 when the acknowledgement segment reaches server device 40. Since the retransmission timer has not expired at this point, CPU 41, upon receipt of the acknowledgement segment, stops the retransmission timer for the data segment transmitted at t0, to thereby end the retransmission timer process for the data segment.

An operation for a general communication system will now be described with reference to FIG. 9. A server device transmits a data segment at t0, at which a retransmission timer for the data segment is started. The retransmission timer expires at the server device at t1 without receiving an acknowledgement segment for the transmitted data segment. The server device then assumes that the data segment has been lost, and prepares to retransmit the data segment and starts a retransmission timer for the data segment. The retransmission timer expires at the server device at t3 without receiving an acknowledgement segment for the transmitted data segment. The server device makes a determination that the segment has been lost, and retransmits the segment. As shown in FIG. 9, the server device receives an acknowledgement segment for a data segment transmitted at t0, t1, and t3 after the third transmission of the data segment.

As is clear from the above comparison, according to the present embodiment, it is possible to reduce occurrences of retransmission triggered by a retransmission timeout, which cause a transmitter device to assume that the data segment has been lost.

Figure 10:
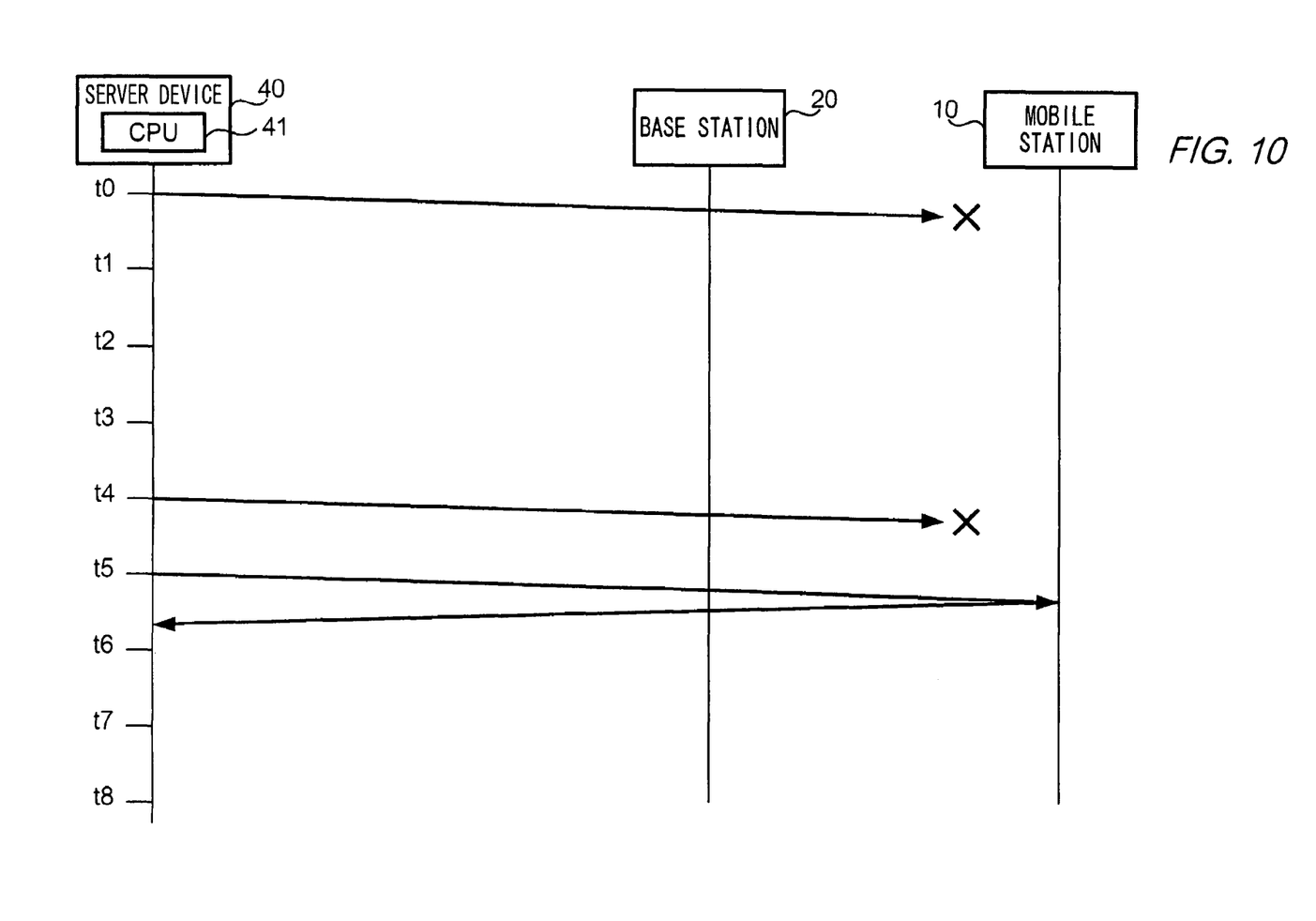
FIG. 10 is a sequence diagram for explaining an operation of communication system 100.
Figure 11:
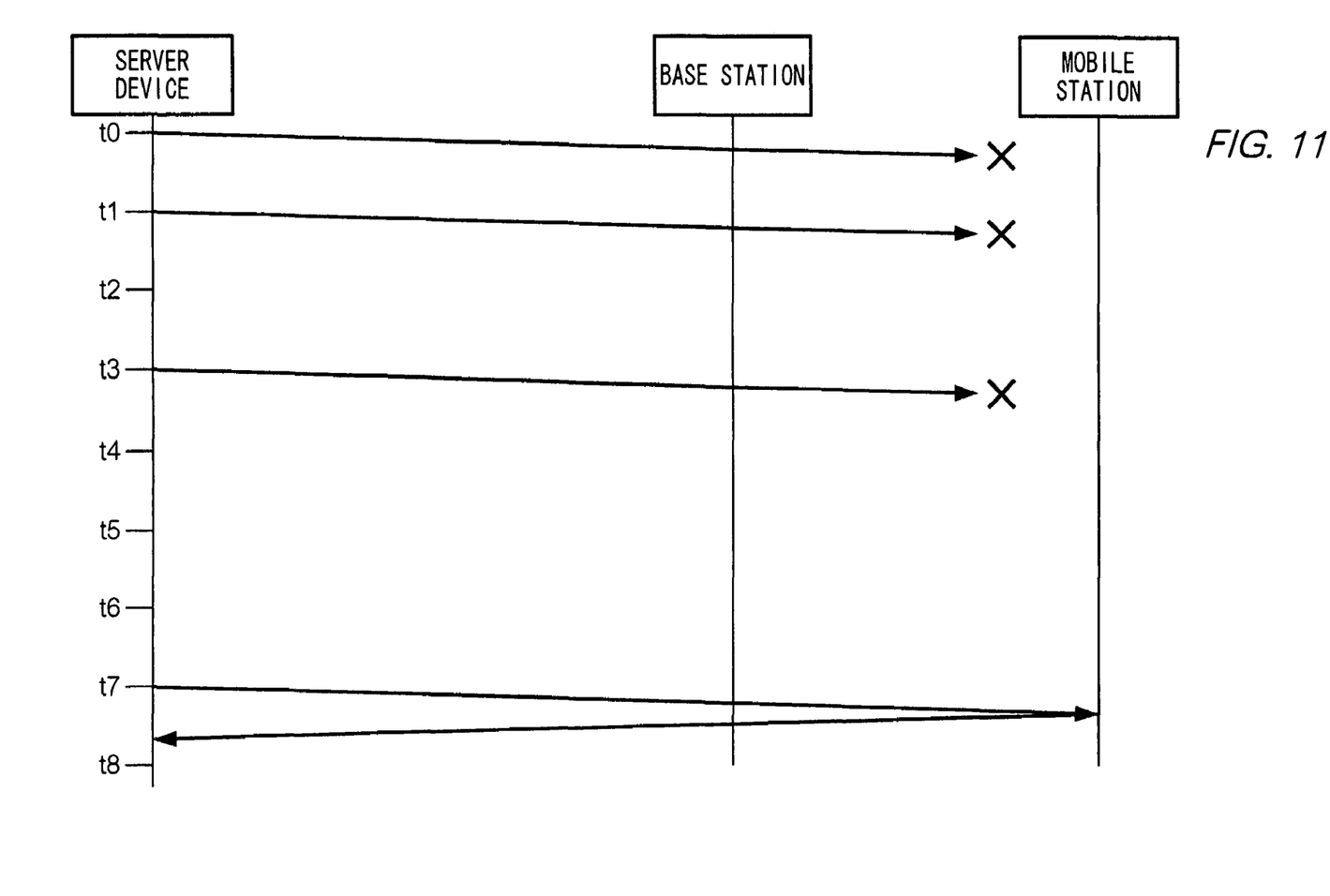
FIG. 11 is a sequence diagram for explaining an operation of a general communication system.

An operation of a case where a data segment is lost will now be described with reference to FIGS. 10 and 11. A sequence shown in each of the figures assumes that communication quality in a wireless link between mobile station 10 and base station 20 deteriorates considerably between t0 and t5, and is rapidly restored between t5 and t6.

First, an operation of communication system 100 will be described with reference to FIG. 10. CPU 41 of server device 40 transmits a data segment at t0, at which time a retransmission timer process is started. The retransmission timer process performed here is the same as that which has been described above (Steps SA1, SA2, SA3, and SA4: NO). A data segment transmitted by CPU 41 is transmitted to a wireless zone through base station 20, but is lost. As a result, server device 40 does not receive an acknowledgement segment for the data segment and the retransmission timer for the data segment expires at t4 (Step SA4: YES). The server device then assumes that the data segment has been lost, retransmits the data segment and starts a retransmission timer for the retransmitted segment (Step SA5: NO, Steps SA6, SA2, SA3, and SA4: NO).

The data segment is transmitted through base station 20 to a wireless zone but is lost again. Server device 40 does not receive an acknowledgement segment for the data segment, and a retransmission timer for the data segment expires at t5 (Step SA4: YES). Server device 40 assumes the data segment has been lost, retransmits the data segment, and starts a retransmission timer for the segment (Step SA5: N0, SA6, SA2, SA3, SA4: NO). The retransmission timer is set to expire at the timing of t7.

A data segment transmitted by CPU 41 is transferred to mobile station 10 via base station 20 and via a wireless link whose communication quality has rapidly been restored. Mobile station 10 receives the data segment and transmits an acknowledgement segment in response. The acknowledgement segment is transferred through base station 20 to server device 40. The time is between t5 and t6 when the acknowledgement segment reaches server device 40 as shown in FIG. 10. Since the retransmission timer has not expired at this point of time, CPU 41, upon receipt of the acknowledgement segment, stops the retransmission timer for the data segment transmitted at t5, to thereby end the retransmission timer process for the data segment.

An operation of a general communication system will now be described with reference to FIG. 11. A server device transmits a data segment at t0, and activates a retransmission timer for the data segment. The retransmission timer expires at the server device at t1 without receiving an acknowledgement segment for the transmitted data segment. As a result, the server device assumes that the data segment has been lost, retransmits the data segment and activates a retransmission timer for the data segment. The retransmission timer expires at the server device at t3 without receiving an acknowledgement segment for the transmitted data segment. The server device assumes that the data segment has been lost, retransmits the data segment and activates a retransmission timer for the data segment. The retransmission timer again expires at the server device at t7 without receiving an acknowledgement segment for the transmitted data segment. The server device assumes that the data segment has been lost, retransmits the data segment and activates a retransmission timer for the data segment. The retransmission timer is to expire at the timing of 8 s. However, as shown in FIG. 11, the server device receives an acknowledgement segment for the data segment between t7 and t8.

As is clear from the above comparison, according to the present embodiment, server device 40 transmits the identical data segment fewer times compared to a general server device. Thus, few detrimental effects are caused by retransmission on transmission efficiency or on congestion existing in a communication network between server device 40 and mobile station 10.

In the present embodiment, server device 40 is capable of changing a time table to be used depending on a communication interface used for communication (i.e., a communication network used for communication). Therefore, the technique of the present invention is well suited for use in a device which communicates via a plurality of communication networks such as a gateway server. The present invention can also be applied to a device which exclusively uses a plurality of communication networks.

Further, in the present embodiment, server device 40 changes a time table to be used depending on a sub-net mask of a correspondent device (i.e., a communication address of a correspondent device). Thus, the present invention is well suited for use in an environment where a device communicating via a wireless network and a device communicating via a wired network are mixed.

Modification

In the above embodiment, only server device 40 determines a retransmission timeout value on the basis of a time table for a wireless network, but mobile station 10 may also be modified to perform the same process.

In the above embodiment, a retransmission timeout value stored in a table is used in the retransmission timer process, but a function may be used to compute an appropriate retransmission timeout value, so that the computed retransmission timeout value is used in the process.

In the above embodiment, the upper limit of propagation delay in Datalink Layer is determined based on the maximum number of times of retransmission allowed for a data frame and the upper limit of the data transfer time. However, either of the maximum allowed number of times or the upper transfer time limit may be used.

Further, in the above embodiment, 4 s is set to a retransmission timeout value corresponding to a first-time data segment transmission in Transport Layer but may be any other value if it corresponds to an upper limit of propagation delay in a wireless link (i.e., Datalink Layer) which is determined by taking into account a maximum number of times of retransmission allowed for a data frame and/or an upper limit of the data frame transfer time. Such a value may even be a value close to 1 s or 10 s as long as the value is determined considering an upper limit of propagation delay in a wireless link, with such an upper limit being a value considering a propagation delay particular to a wireless link and/or retransmission of a data frame performed according to a protocol for a wireless link in the lower layer. Nevertheless, an initial value of a retransmission timeout value for a data segment in Transport Layer may preferably be somewhere between 3 s to 6 s.

In the above embodiment, server device 40 and base station 20 are separate units but may be unified as one device unit. The device detects the upper limit of propagation delay in Datalink Layer, so that time corresponding to the detected upper limit may be set in a time table as a retransmission timeout value corresponding to the first-time data segment transmission.

In the above embodiment, a time table is selected based on a communication interface used and a subnetwork to which a correspondent device belongs, but either one of them may be used to select a time table.

In the above embodiment, retransmission of data frames is raised as an example of a factor causing propagation delay in a wireless link. The present invention may be applied to a system using a wireless link where propagation delay is caused by another factor. A link may be a wired link where propagation delay is caused.

In the above embodiment, only the first retransmission timeout value corresponding to the first data transmission in a time table is decided upon the upper limit of propagation delay in Datalink Layer (e.g. 4 s), but the present invention is not limited thereto.

Figure 12:
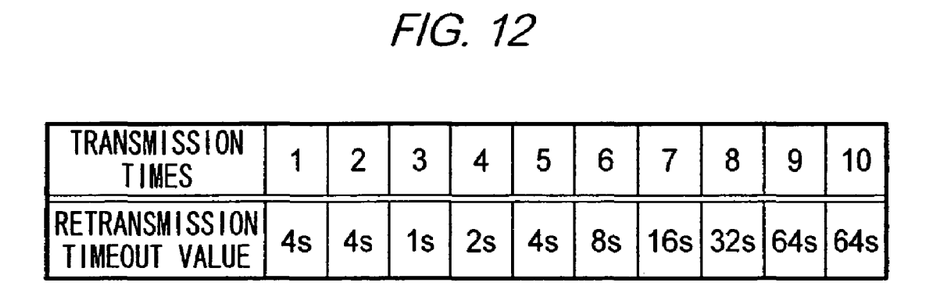
FIG. 12 is a schematic diagram showing details of another time table.

For example, as shown in FIG. 12, retransmission timeout values for the first- and second-time segment transmissions may be set to a value (e.g. 4 s) taking into account the upper limit of propagation delay in Datalink Layer. Retransmission timeout values on and after the third-time segment transmission may start from an initial value of, for example, 1 s and then increase exponentially.

Figure 13:
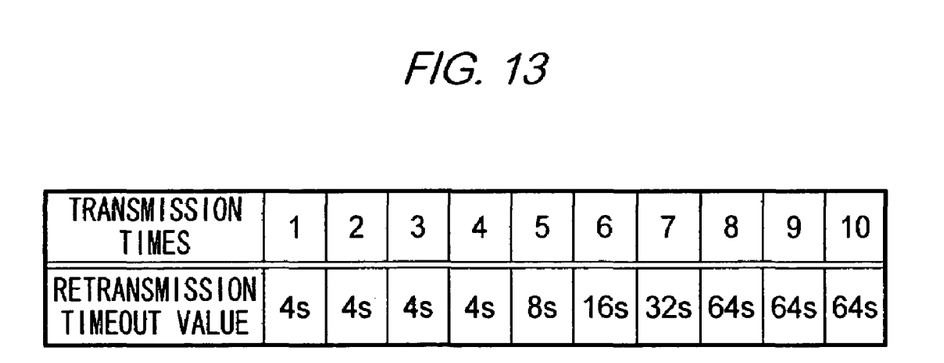
FIG. 13 is a schematic diagram showing details of still another time table.

Further, as shown in FIG. 13, retransmission timeout values for the first- second-, and third-time segment transmissions may be set to a value (e.g. 4 s) taking into account the upper limit of propagation delay in Datalink Layer. Retransmission timeout values on and after the fourth-time segment transmission may start from an initial value of, for example 4 s, and then increase exponentially.

Figure 14:
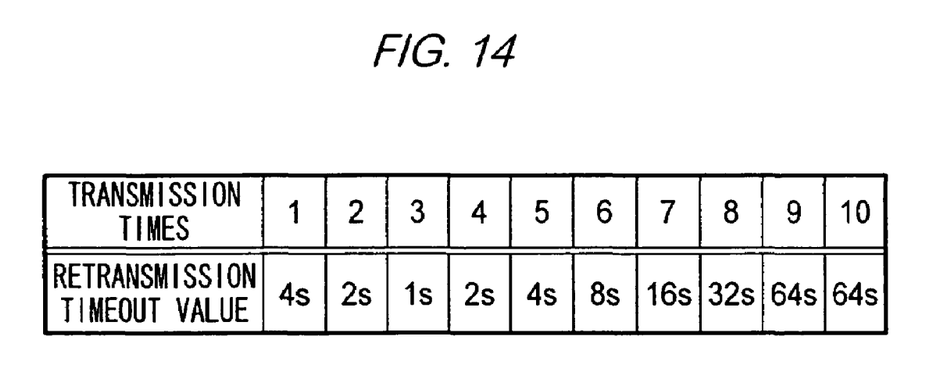
FIG. 14 is a schematic diagram showing details of yet another time table.

Still further, as shown in FIG. 14, a retransmission timeout value for the first time segment transmission may be set to a value (e.g. 4 s) taking into account the upper limit of propagation delay in Datalink Layer. Retransmission timeout values on and after the third-time segment transmission may start from an initial value of, for example, 1 s and then increase exponentially. A retransmission timeout value for the second-time segment transmission may be set to a half of the retransmission timeout value, and retransmission timeout values on and after the third-time segment transmission may start from an initial value of, for example, 1 s and then increase exponentially.

Still further, if specifications allow, a retransmission timeout value for the first segment transmission may be set to a value (e.g. 4 s) taking into account the upper limit of propagation delay in Datalink Layer. Retransmission timeout values on and after the second time segment transmission may start from an initial value of, for example, 1 s and then increase monotonically. An example of monotonic increase is a linear increase.

The invention claimed is:

1. A transmitter device comprising a memory and a processor, the processor in communication with the memory and operable to:

transmit a data block to a receiver device in a Transport Layer;

receive data from the receiver device in the Transport Layer;

retransmit the data block in a plurality of retransmissions, wherein each of the retransmissions is made after an elapsed time reaches a retransmission timeout value, and the elapsed time is measured from a most recent one of the retransmissions or an initial transmission;

set the retransmission timeout value corresponding to each of the retransmissions made prior to a predetermined retransmission to a predetermined time value, wherein the predetermined retransmission is included in the retransmissions; and set the retransmission timeout value corresponding to each of the retransmissions made on or after the predetermined retransmission to a time value different from the predetermined time value and determined according to a monotonically increasing function of a number of the retransmissions made as of each of the retransmissions, wherein each of the retransmissions made on or after the predetermined retransmission is made within a given time period, the given time period measured from the predetermined retransmission.

2. The device of claim 1, wherein the monotonically increasing function is exponential.

3. The device of claim 1, wherein the processor is further operable to:

set the retransmission timeout value corresponding to each of the retransmissions to an alternate time value determined according to the monotonically increasing function of the number of the retransmissions made as of each of the retransmissions, wherein a network to which the receiver device belongs is not a predetermined network.

4. The device of claim 1, the processor further operable to:

connect to the receiver device over a first network;

connect to the receiver device over a second network; and set the retransmission timeout value corresponding to each of the retransmissions to an alternate time value determined according to the monotonically increasing function of the number of the retransmissions made as of each of the retransmissions, wherein each of the retransmissions and the initial transmission of the data block is transmitted in the second network to the receiver device in the Transport Layer.

5. A transmitter device comprising a memory and a processor, the processor in communication with the memory and operable to:

transmit a data block to a receiver device in a Transport Layer;

receive data from the receiver device in the Transport Layer;

retransmit the data block in a plurality of retransmissions, wherein each of the retransmissions is made after an elapsed time reaches a retransmission timeout value, wherein the elapsed time is measured from a most recent one of the retransmissions or an initial transmission;

detect an upper limit of at least one of a transfer time of a transmitted data frame in a communication link, and a number of data frame retransmissions of a given data frame in the communication link, wherein the communication link forms a part of a communication path between the transmitter device and the receiver device;

set the retransmission timeout value corresponding to each of the retransmissions made prior to a predetermined retransmission to the upper limit, wherein the predetermined retransmission is included in the retransmissions; and set the retransmission timeout value corresponding to each of the retransmissions made on or after the predetermined retransmission to a time value determined according to a monotonic ally increasing function of a number of the retransmissions made as of each of the retransmissions, wherein each of the retransmissions made on or after the predetermined retransmission is made within a given time period, the given time period measured from the predetermined retransmission.

6. The device of claim 5,
wherein the upper limit is between 3 seconds to 6 seconds.

7. A transmitter device comprising a memory and a processor, the processor in communication with the memory and operable to:

transmit a data block in a Transport Layer;

receive data from a receiver device in the Transport Layer;

retransmit the data block in a plurality of retransmissions, wherein each of the retransmissions of the data block is made after an elapsed time reaches a retransmission timeout value, wherein the elapsed time is measured from a most recent one of the retransmissions of the data block or an initial transmission of the data block;

retransmit a lost data frame that includes a portion of the data block, wherein the lost data frame was previously transmitted and lost in a communication link forming a part of a communication path between the transmitter device and the receiver device, wherein the communication link includes an upper limit of a propagation delay based on at least one of a maximum transfer time of a data frame transmitted in the communication link and a maximum number of retransmissions of a given data frame in the communication link, wherein at least one of a transfer time of the lost data frame and a number of retransmissions of the lost data frame is under the upper limit;

set the retransmission timeout value corresponding to each of the retransmissions of the data block made prior to a predetermined retransmission of the data block to a time value of the upper limit, wherein the predetermined retransmission of the data block is included in the retransmissions of the data block; and set the retransmission timeout value corresponding to each of the retransmissions of the data block made on or after the predetermined retransmission of the data block to a time value determined according to a monotonically increasing function of a number of retransmissions of the data block made as of each of the retransmissions of the data block, wherein each of the retransmissions of the data block made on or after the predetermined retransmission of the data block is made within a given time period, the given time period measured from the predetermined retransmission of the data block.

8. The device of claim 7,
wherein the communication link is a wireless link.

9. A computer readable media program product that includes computer program code executable by a computer that when executed comprises:

transmission of a data block to a receiver device in a Transport Layer;

receipt of data from the receiver device in the Transport Layer;

retransmission of the data block in a plurality of retransmissions, wherein each of the retransmissions is made after an elapsed time reaches a retransmission timeout value, and the elapsed time is measured from a most recent one of the retransmissions or an initial transmission;

assignment of the retransmission timeout value corresponding to each of the retransmissions made prior to a predetermined retransmission to a predetermined value, wherein the predetermined retransmission is included in the retransmissions; and assignment of the retransmission timeout value corresponding to each of the retransmissions made on or after the predetermined retransmission to a time value determined according to a monotonically increasing function of a number of the retransmissions made as of each of the retransmissions, wherein each of the retransmissions made on or after the predetermined retransmission is made within a given time period, the given time period measured from the predetermined retransmission.

* * * * *